United States Patent
Zeng et al.

(10) Patent No.: US 11,817,127 B2
(45) Date of Patent: Nov. 14, 2023

(54) VIDEO DUBBING METHOD, APPARATUS, DEVICE, AND STORAGE MEDIUM

(71) Applicant: Beijing Bytedance Network Technology Co., Ltd., Beijing (CN)

(72) Inventors: Yan Zeng, Beijing (CN); Chen Zhao, Beijing (CN); Qifan Zheng, Beijing (CN); Pingfei Fu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/885,241

(22) Filed: Aug. 10, 2022

(65) Prior Publication Data
US 2022/0383905 A1    Dec. 1, 2022

Related U.S. Application Data

(63) Continuation of application No. PCT/CN2021/107817, filed on Jul. 22, 2021.

(30) Foreign Application Priority Data

Jul. 23, 2020   (CN) ......................... 202010728035.2

(51) Int. Cl.
*G11B 27/031*   (2006.01)
*G11B 27/34*    (2006.01)

(52) U.S. Cl.
CPC ............ *G11B 27/031* (2013.01); *G11B 27/34* (2013.01)

(58) Field of Classification Search
CPC .............................. G11B 27/031; G11B 27/34
See application file for complete search history.

(56) References Cited

U.S. PATENT DOCUMENTS 5,970,459 A  * 10/1999 Yang .................. G06F 16/4393
                                                      704/E21.02
10,706,347 B2 * 7/2020 Garcia .................... G06N 5/02
(Continued)

FOREIGN PATENT DOCUMENTS

CN        104104987 A      10/2014
CN        104468317 A       3/2015
(Continued)

OTHER PUBLICATIONS

NUENDO7, Advanced Audio Post-Production System, Operation Manual, Steinberg Media Technologies GmbH, 2015, Retrieved from the Internet <URL: https://www.google.com/url?sa=t&rct=j&q=&esrc=s&source=web&cd=&cad=rja&uact=8&ved=2ahUKEwiw9r2Gjr6AhWGl4sKHbloAosQFnoECBUQAQ&url=https%3A%2F%2Fdownload.steinberg.net%2Fdownloads_software%2Fnuendo_7%2FNuendo_7_Operation_Manual_english.pdf&usg=AOvVaw2TJnn18iaBqYfxiKhpcpj,> 1545 pages.
(Continued)

*Primary Examiner* — Mishawn N. Hunter
(74) *Attorney, Agent, or Firm* — ARENTFOX SCHIFF LLP

(57) ABSTRACT

The present disclosure provides a video dubbing method, an apparatus, a device, and a storage medium. The method includes: when receiving an audio recording start trigger operation for a first time point of a target video and starting from a video picture corresponding to the first time point, playing the target video based on a timeline and receiving audio data based on the timeline; and when receiving an audio recording end trigger operation for a second time point, generating an audio recording file. The audio recording file has a linkage relationship with a timeline of a video clip taking the video picture corresponding to the first time
(Continued)

point as a starting frame and taking a video picture corresponding to the second time point as an ending frame.

18 Claims, 3 Drawing Sheets

(56) References Cited

U.S. PATENT DOCUMENTS

| | | | | |
|---|---|---|---|---|
| 2005/0042591 | A1* | 2/2005 | Bloom | G11B 27/34 434/308 |
| 2009/0037179 | A1* | 2/2009 | Liu | G10L 13/08 704/260 |
| 2009/0175596 | A1* | 7/2009 | Hirai | H04N 21/4884 348/E7.001 |
| 2011/0113335 | A1 | 5/2011 | Rouse et al. | |
| 2012/0210231 | A1 | 8/2012 | Ubillos et al. | |
| 2013/0085825 | A1* | 4/2013 | Davis | G06Q 30/06 705/310 |
| 2015/0363899 | A1* | 12/2015 | Krause | G06Q 50/184 705/26.3 |
| 2016/0105725 | A1 | 4/2016 | Shore | |
| 2016/0365087 | A1* | 12/2016 | Freud | G10L 13/10 |
| 2018/0279016 | A1 | 9/2018 | Tang | |
| 2018/0330756 | A1* | 11/2018 | MacDonald | G06F 16/951 |
| 2019/0378487 | A1* | 12/2019 | Ayala | G10H 7/08 |
| 2020/0007946 | A1* | 1/2020 | Olkha | G06F 40/263 |
| 2020/0404386 | A1* | 12/2020 | Mccartney, Jr. | H04N 21/2335 |
| 2021/0014575 | A1* | 1/2021 | Selfors | H04N 21/4856 |

FOREIGN PATENT DOCUMENTS

| | | |
|---|---|---|
| CN | 105959773 A | 9/2016 |
| CN | 106060424 A | 10/2016 |
| CN | 106293347 A | 1/2017 |
| CN | 106911900 A | 6/2017 |
| CN | 107197186 A | 9/2017 |
| CN | 107295416 A | 10/2017 |
| CN | 108769733 A | 11/2018 |
| CN | 109587543 A | 4/2019 |
| CN | 109819313 A | 5/2019 |
| CN | 110753263 A | 2/2020 |
| CN | 110971957 A | 4/2020 |
| CN | 111741231 A | 10/2020 |
| JP | 3067801 B2 | 7/2000 |
| JP | 2008310844 A | 12/2008 |
| KR | 20070006159 A | 1/2007 |
| KR | 20140051115 A | 4/2014 |
| KR | 20180091905 A | 8/2018 |
| RU | 2527732 C2 | 9/2014 |

OTHER PUBLICATIONS

Extended European Search Report in EP21845291.0, dated Jul. 7, 2023, 7 pages.

* cited by examiner

VIDEO DUBBING METHOD, APPARATUS, DEVICE, AND STORAGE MEDIUM

CROSS REFERENCE TO RELATED APPLICATIONS

This application is a continuation of International Patent Application No. PCT/CN2021/107817, filed on Jul. 22, 2021, which claims priority to the Chinese patent application No. 202010728035.2 filed on Jul. 23, 2020. The disclosures of the aforementioned applications are hereby incorporated by reference in their entireties.

TECHNICAL FIELD

The present disclosure relates to a field of data processing, and more particularly, to a video dubbing method, an apparatus, a device, and a storage medium.

BACKGROUND

Video dubbing refers to dubbing pictures of a video by recording sound through a device. At present, audio data is usually recorded based on a separate audio recording window to obtain an audio recording file including the audio data, and then the audio recording file is add to an audio track of a target video, the timeline is manually matched, and finally the dubbing of the target video is completed.

However, to complete the dubbing of the target video, users not only need to perform an audio recording, but also need to manually match the audio recording file with the timeline of the audio track of the target video, which is obviously a complicated work. In addition, there may be a problem of inaccurate video dubbing results caused by manually matching the timeline.

SUMMARY

In order to solve the above-mentioned problems or at least partially solve the above-mentioned problems, the present disclosure provides a video dubbing method, an apparatus, a device, and a storage medium, which does not need to manually match the timeline, and improves the accuracy of video dubbing results.

In a first aspect, the present disclosure provides a video dubbing method, the method comprises:

in response to an audio recording start trigger operation for a first time point of a target video and starting from a video picture corresponding to the first time point, playing the target video based on a timeline and receiving audio data based on the timeline; and in response to an audio recording end trigger operation for a second time point of the target video, generating an audio recording file comprising the audio data from the first time point to the second time point, where the audio recording file is configured for dubbing a video clip, the video clip takes the video picture corresponding to the first time point as a starting frame and takes a video picture corresponding to the second time point as an ending frame, and the audio recording file has a linkage relationship with a timeline of the video clip.

In an optional embodiment, before the in response to the audio recording end trigger operation for the second time point of the target video, generating the audio recording file comprising the audio data from the first time point to the second time point further comprises:

controlling a pointer on an audio track to follow a video picture being played when playing the target video based on the timeline and receiving the audio data based on the timeline, where the pointer is configured to indicate a current audio recording progress.

In an optional embodiment, the method further comprises:

in a state where a video dubbing is paused, in response to a drag operation on the pointer, updating the first time point by using a time point corresponding to a target frame of the drag operation.

In an optional embodiment, before the in response to the audio recording end trigger operation for the second time point of the target video, generating the audio recording file comprising the audio data from the first time point to the second time point further comprises:

displaying a waveform diagram of the audio data based on the timeline when playing the target video based on the timeline and receiving the audio data based on the timeline.

In an optional embodiment, before the in response to the audio recording start trigger operation for the first time point of the target video and starting from the video picture corresponding to the first time point, playing the target video based on the timeline and receiving the audio data based on the timeline further comprises:

displaying a flashing animation at a position of the first time point of the target video, where the flashing animation is configured to prompt a preparation of audio recording based on the first time point.

In an optional embodiment, after the in response to the audio recording end trigger operation for the second time point of the target video, generating the audio recording file comprising the audio data from the first time point to the second time point further comprises:

performing a preview playing on the video clip and the audio recording file having the linkage relationship with the timeline of the video clip.

In a second aspect, the present disclosure further provides a video dubbing apparatus, the apparatus comprises:

a receiving module, being configured to, in response to an audio recording start trigger operation for a first time point of a target video and start from a video picture corresponding to the first time point, play the target video based on a timeline and receive audio data based on the timeline; and a generation module, being configured to, in response to an audio recording end trigger operation for a second time point of the target video, generate an audio recording file comprising the audio data from the first time point to the second time point; the audio recording file is configured for dubbing a video clip, the video clip takes the video picture corresponding to the first time point as a starting frame and takes a video picture corresponding to the second time point as an ending frame, and the audio recording file has a linkage relationship with a timeline of the video clip.

In an optional embodiment, the apparatus further comprises:

a control module, being configured to control a pointer on an audio track to follow a video picture being played when playing the target video based on the timeline and receiving the audio data based on the timeline, where the pointer is configured to indicate a current audio recording progress.

In a third aspect, the present disclosure further provides a computer-readable storage medium, instructions are stored in the computer-readable storage medium, and the instructions, when executed on a terminal device, enable the terminal device to implement any one of the above-mentioned methods.

In a fourth aspect, the present disclosure further provides a device, which comprises: a memory; a processor; and a computer program, being stored on the memory and capable of running on the processor, where the processor, when executing the computer program, implements any one of the above-mentioned methods.

Compared with the prior art, the technical solutions provided by the embodiments of the present disclosure have the following advantages.

The present disclosure provides a video dubbing method, and the method includes: when receiving an audio recording start trigger operation for a first time point of a target video and starting from a video picture corresponding to the first time point, playing the target video based on a timeline and receiving audio data based on the timeline; and when receiving an audio recording end trigger operation for a second time point, generating an audio recording file comprising the audio data from the first time point to the second time point. In the above-mentioned method, the audio recording file has a linkage relationship with a timeline of a video clip, and the video clip takes the video picture corresponding to the first time point as a starting frame and takes a video picture corresponding to the second time point as an ending frame. Because the present disclosure performs an audio recording based on a timeline while playing a target video, the generated audio recording file has a linkage relationship with a timeline of a corresponding video clip, that is, a more accurate video dubbing result can be obtained without re-matching the audio recording file and the timeline of the video clip subsequently, avoiding the problems of complicated operations and inaccurate video dubbing results caused by manually matching the timeline.

BRIEF DESCRIPTION OF THE DRAWINGS

The drawings herein are incorporated into and form a part of the specification, showing embodiments in accordance with the present disclosure, and are used together with the specification to explain the principles of the present disclosure.

In order to more clearly illustrate the embodiments of the present disclosure or the technical solutions in the prior art, the following will briefly introduce the drawings that need to be used in the description of the embodiments or the prior art. It is obvious that for those skilled in the art, other drawings may be obtained from these drawings without creative labor.

DETAILED DESCRIPTION

In order to better understand the above-mentioned purposes, features and advantages of the present disclosure, the solutions of the present disclosure will be further described below. It should be noted that, the embodiments of the present disclosure and features in the embodiments may be combined with each other in case of no conflict.

Many specific details are illustrated in the following description to facilitate a full understanding of the present disclosure, but the present disclosure may also be implemented in other ways different from those described here; apparently, the embodiments in the specification are just a part but not all of the embodiments of the present disclosure.

At present, a video is usually dubbed based on a separate audio recording window. After obtaining an audio recording file, it is necessary to manually match the audio recording file with a timeline of the video, and finally complete the video dubbing.

However, the way of manually matching the audio recording file with the timeline of the video not only has the problem of complicated operations, but also may lead to inaccurate video dubbing results.

To this end, the present disclosure provides a video dubbing method, and the method includes: when receiving an audio recording start trigger operation for a first time point of a target video and starting from a video picture corresponding to the first time point, playing the target video based on a timeline and receiving audio data based on the timeline; and when receiving an audio recording end trigger operation for a second time point of the target video, generating an audio recording file including the audio data from the first time point to the second time point. In the above-mentioned method, the audio recording file has a linkage relationship with a timeline of a video clip, and the video clip takes the video picture corresponding to the first time point as a starting frame and takes a video picture corresponding to the second time point as an ending frame.

Because the present disclosure performs an audio recording based on the timeline while playing the target video, and the generated audio recording file has a linkage relationship with the timeline of the corresponding video clip, that is, a more accurate video dubbing result can be obtained without re-matching the audio recording file and the timeline of the video clip, avoiding the problems of complicated operations and inaccurate video dubbing results caused by manually matching the timeline.

Figure 1:
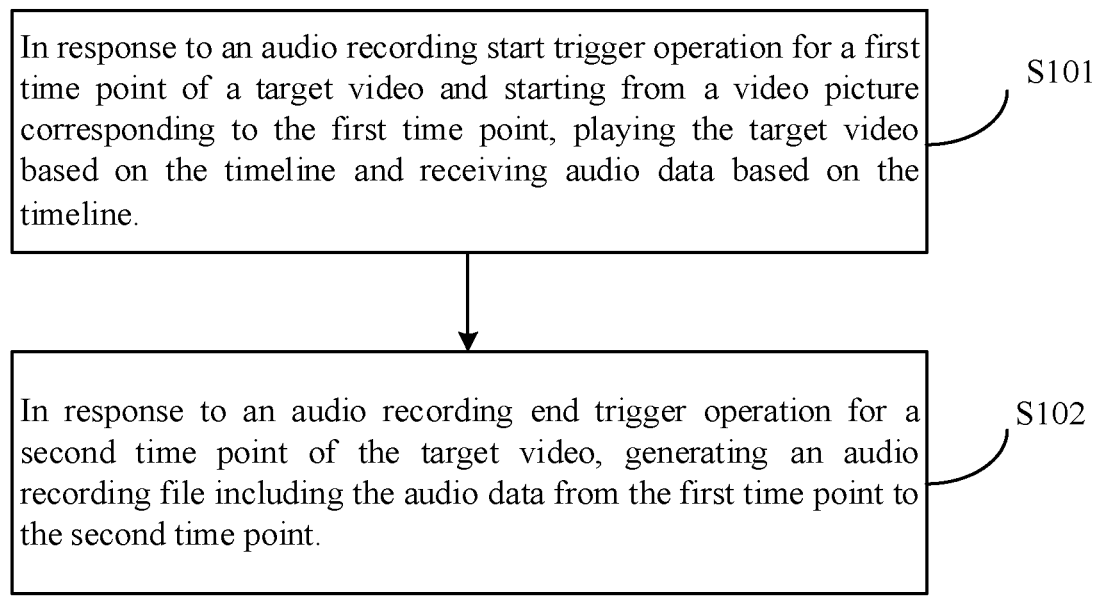
FIG. 1 is a flowchart of a video dubbing method provided by at least an embodiment of the present disclosure.

Based on this, at least an embodiment of the present disclosure provides a video dubbing method. FIG. 1 is a flowchart of a video dubbing method provided by at least an embodiment of the present disclosure, the method includes the following operations.

S101: in response to an audio recording start trigger operation for a first time point of a target video and starting from a video picture corresponding to the first time point, playing the target video based on the timeline and receiving audio data based on the timeline.

For example, the target video is any piece of video obtained in advance, as a processing object of the embodiment of the present disclosure.

For example, the first time point is a starting time point of the target video or any time point in the target video. The first time point may be determined according to user's audio recording requirements.

Figure 2:
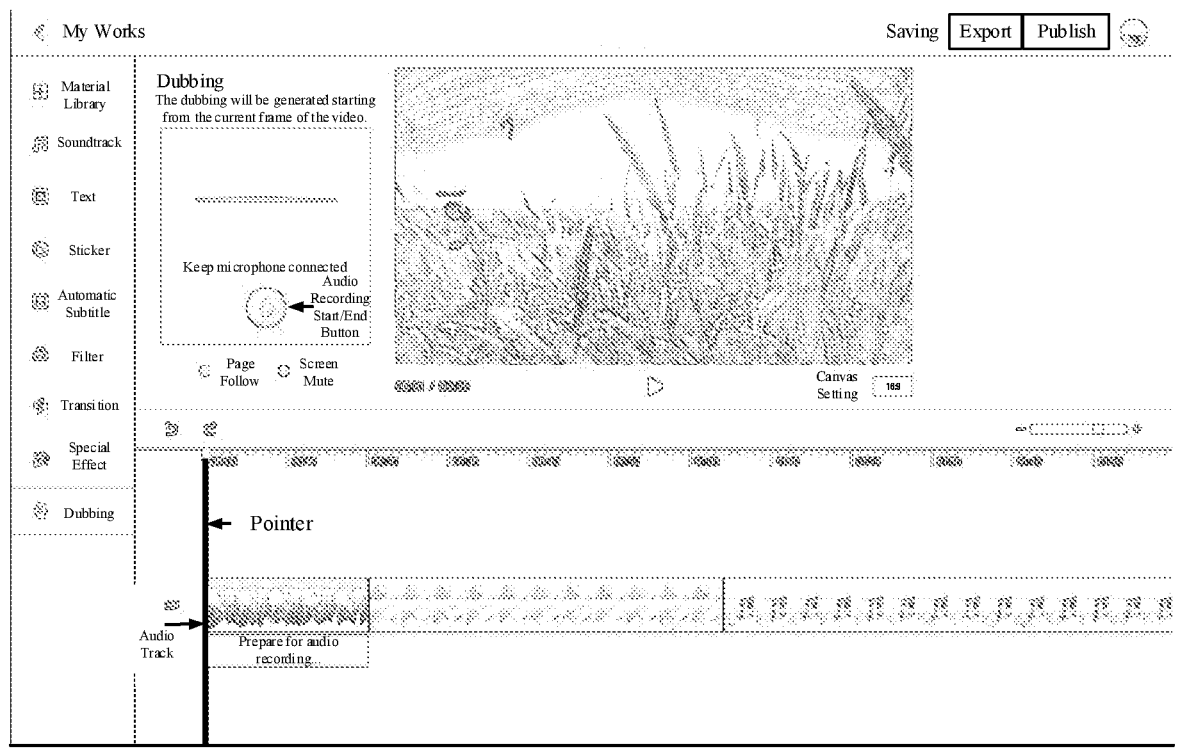
FIG. 2 is a schematic diagram of an interface of a video audio recording in an unrecorded state provided by at least an embodiment of the present disclosure.

In practical applications, before dubbing the target video, an audio track of the target video is displayed first. FIG. 2 is a schematic diagram of an interface of a video audio recording in an unrecorded state provided by at least an embodiment of the present disclosure. For example, the user may determine the first time point in the target video at which the audio recording starts on the audio track, and then trigger a start audio recording operation for the first time point. Specifically, the start audio recording operation from the first time point may be triggered by an operation of clicking an audio recording start button.

Accordingly, the system, after receiving the audio recording start trigger operation for the first time point of the target video and starting from the video picture corresponding to the first time point in the target video, plays the target video based on the timeline, and receives the audio data input by the user based on the timeline to realize the video audio recording.

In the embodiments of the present disclosure, based on the same timeline, the target video is played from the video picture corresponding to the first time point, and the audio data input by the user is received at the same time. Therefore, the finally obtained audio recording file has a linkage relationship with the timeline of the target video, and there is no need to match the timelines of the audio recording file and the target video subsequently.

In an optional embodiment, after determining the first time point in the target video, the interface of video audio recording displays a flashing animation at a position of the first time point of the target video. For example, the flashing animation is a flashing animation of "Prepare for audio recording . . . " as shown in FIG. 2, which is configured to prompt the user to prepare for audio recording based on the first time point. For example, the position of the pointer in FIG. 2 is the position of the first time point of the target video.

For example, the position of the first time point displaying the flashing animation includes a position near the first time point on the audio track of the target video.

S102: in response to an audio recording end trigger operation for a second time point of the target video, generating an audio recording file including the audio data from the first time point to the second time point.

For example, the audio recording file is configured for dubbing a video clip, the video clip takes the video picture corresponding to the first time point as a starting frame and takes the video picture corresponding to the second time point as an ending frame, and the audio recording file has a linkage relationship with a timeline of the video clip.

For example, the second time point is an end time point of the target video or any time point in the target video. The second time point may be determined according to user's video audio recording requirements. For example, the second time point is after the first time point in the target video.

In practical applications, the user may determine the second time point for ending audio recording in the target video on the audio track, and then trigger an end audio recording operation for the second time point. Specifically, the end audio recording operation from the first time point to the second time point may be triggered by an operation of clicking an audio recording end button.

In the embodiments of the present disclosure, after receiving the audio recording end trigger operation, the audio recording file including the audio data received from the first time point to the second time point is generated. For example, the audio recording file is configured to dub the video clip with the video picture corresponding to the first time point as the starting frame and the video picture corresponding to the second time point as the ending frame.

Because the audio recording file has a linkage relationship with the timeline of the video clip, the embodiment of the present disclosure can automatically obtain more accurate video dubbing results without matching the audio recording file and the timeline of the video clip.

Figure 3:
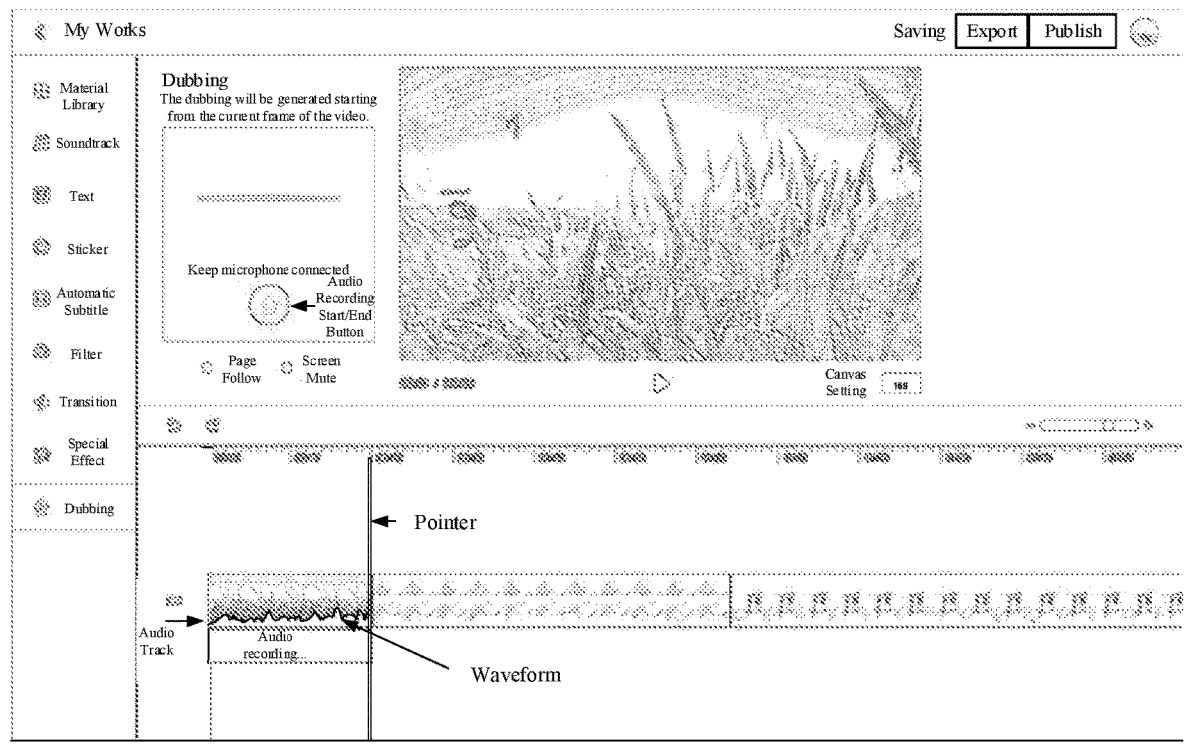
FIG. 3 is a schematic diagram of an interface of a video audio recording in a recording state provided by at least an embodiment of the present disclosure.

In an optional embodiment, in order to facilitate the user to know the current dubbing progress, the pointer on the audio track may be controlled to follow a video picture being played during the process of playing the target video based on the timeline and receiving the audio data based on the timeline, and the position of the pointer is configured to indicate the current audio recording progress. FIG. 3 is a schematic diagram of an interface of a video audio recording in a recording state provided by at least an embodiment of the present disclosure, for example, the pointer on the audio track moves from the starting position of the pointer in FIG. 2 to the position in FIG. 3 according to the video picture being played.

In another optional embodiment, in order to enable the user more intuitively feel that audio recording data of the dubbed part is successfully received by the system, that is, the audio recording is effective, at least one embodiment of the present disclosure displays the waveform diagram of a received audio data based on the timeline during the process of playing the target video based on the timeline and receiving the audio data based on the timeline. The display of the waveform diagram enables the user more intuitively feel that the audio data of the dubbed part is effective. As shown in FIG. 3, the waveform diagram of the audio data is displayed on the audio track of the dubbed part, and the prompt of "audio recording . . . " may also be displayed below the waveform diagram to prompt the user that the audio recording is currently in progress.

In another optional embodiment, the video dubbing pause is triggered by a pause dubbing button. In the state where the video dubbing is paused, the target video stops playing the video picture and stops receiving the audio data input by the user. In the state where the video dubbing is paused, the user may trigger an update of the first time point, that is, an update of the starting time point of the video dubbing by dragging the pointer on the audio track to a time point corresponding to a video frame in the target video.

Specifically, in the state where the video dubbing is paused, a drag operation for the pointer on the audio track is received, and the first time point of the video dubbing is updated by using a time point corresponding to a target frame of the drag operation. For example, the target frame of the drag operation is the video frame at the time of releasing a mouse corresponding to the drag operation, and the first time point is updated to the time point corresponding to the video frame. Subsequently, after the second time point is determined, a dubbing operation for a video clip from the updated first time point to the second time point is triggered.

In another optional embodiment, after the video dubbing is completed, the audio recording file and the video clip corresponding to the video dubbing are previewed. Specifically, the audio recording file and the video clip having the linkage relationship with the timeline are performed a preview playing, so that the user can feel the video play picture after the video dubbing is completed.

In the video dubbing method provided by the embodiments of the present disclosure, when receiving an audio recording start trigger operation for the first time point of the target video and starting from the video picture corresponding to the first time point, the target video is played based on the timeline and the audio data is received based on the timeline. When receiving the audio recording end trigger operation for the second time point of the target video, the audio recording file including the audio data from the first time point to the second time point is generated, and the audio recording file has a linkage relationship with the timeline of the video clip taking the video picture corresponding to the first time point as the starting frame and the video picture corresponding to the second time point as the ending frame. Because the embodiments of the present disclosure perform the audio recording based on the timeline while playing the target video, the generated audio recording file has a linkage relationship with the timeline of the corresponding video clip, that is, a more accurate video dubbing result can be obtained without re-matching the audio recording file and the timeline of the video clip, avoiding the problems of complicated operations and inaccurate video dubbing results caused by manually matching the timeline.

Figure 4:
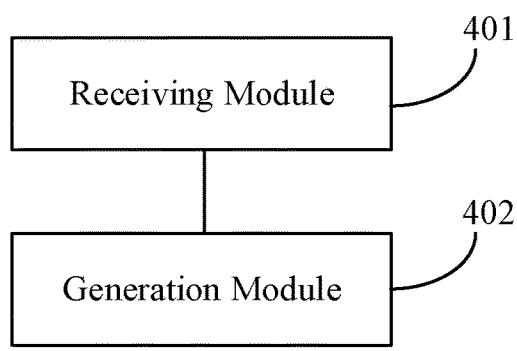
FIG. 4 is a structural block diagram of a video dubbing apparatus provided by at least an embodiment of the present disclosure.

Based on the same inventive concept as the above-mentioned method embodiments, the present disclosure further provides a video dubbing apparatus. FIG. 4 is a structural block diagram of a video dubbing apparatus provided by at least an embodiment of the present disclosure, the apparatus includes a receiving module 401 and a generation module 402.

The receiving module 401 is configured to, in response to an audio recording start trigger operation for a first time point of a target video and start from a video picture corresponding to the first time point, play the target video based on a timeline and receive audio data based on the timeline.

The generation module 402 is configured to, in response to an audio recording end trigger operation for a second time point of the target video, generate an audio recording file including the audio data from the first time point to the second time point. For example, the audio recording file is configured to dub a video clip, the video clip takes the video picture corresponding to the first time point as a starting frame and takes the video picture corresponding to the second time point as an ending frame, and the audio recording file has a linkage relationship with a timeline of the video clip.

In an optional embodiment, the apparatus further includes a control module.

The control module is configured to control a pointer on an audio track to follow a video picture being played when playing the target video based on the timeline and receiving the audio data based on the timeline, and the pointer is configured to indicate a current audio recording progress.

In an optional embodiment, the apparatus further includes an update module.

The update module is configured to, in the state where the video dubbing is paused and in response to a drag operation on the pointer, update the first time point by using the time point corresponding to the target frame of the drag operation.

In an optional embodiment, the apparatus further includes a first display module.

The first display module is configured to display a waveform diagram of the audio data based on the timeline when playing the target video based on the timeline and receiving the audio data based on the timeline.

In an optional embodiment, the apparatus further includes a second display module.

The second display module is configured to display a flashing animation at a position of the first time point of the target video, and the flashing animation is configured to prompt a preparation of audio recording based on the first time point.

In an optional embodiment, the apparatus further includes a preview module.

The preview module is configured to perform a preview playing on the audio recording file and the video clip.

The video dubbing apparatus provided by the embodiment of the present disclosure, when receiving an audio recording start trigger operation for the first time point of the target video and starting from the video picture corresponding to the first time point, plays the target video based on the timeline and receives the audio data based on the timeline. When receiving the audio recording end trigger operation for the second time point of the target video, the audio recording file including the audio data from the first time point to the second time point is generated, and the audio recording file has a linkage relationship with the timeline of the video clip taking the video picture corresponding to the first time point as the starting frame and the video picture corresponding to the second time point as the ending frame. Because the embodiments of the present disclosure perform the audio recording based on the timeline while playing the target video, the generated audio recording file has a linkage relationship with the timeline of the corresponding video clip, that is, a more accurate video dubbing result can be obtained without re-matching the audio recording file and the timeline of the video clip, avoiding the problems of complicated operations and inaccurate video dubbing results caused by manually matching the timeline.

Figure 5:
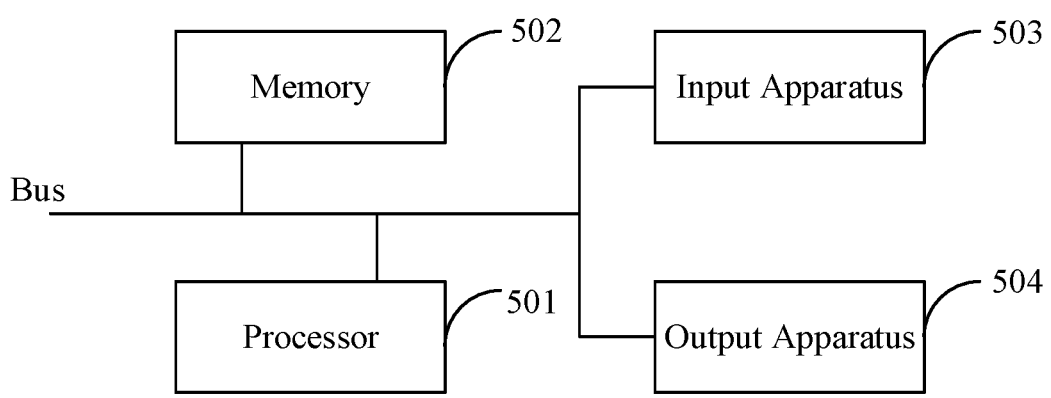
FIG. 5 is a structural block diagram of a video dubbing device provided by at least an embodiment of the present disclosure.

In addition, at least an embodiment of the present disclosure further provides a video dubbing device, as shown in FIG. 5, the device includes a processor 501, a memory 502, an input apparatus 503, and an output apparatus 504. The amount of the processor 501 in the video dubbing device may be one or more, and one processor is taken as an example in FIG. 5. In some embodiments of the present disclosure, the processor 501, the memory 502, the input apparatus 503, and the output apparatus 504 may be connected through a bus or other means, among which the connection through a bus is taken as an example in FIG. 5.

The memory 502 is capable of storing software programs and modules, and the processor 501 executes various functional applications and data processing of the video dubbing device by running the software programs and modules stored in the memory 502. The memory 502 may mainly include a storage program area and a storage data area, and the storage program area is capable of storing an operating system, an application program required for at least one function, and the like. In addition, the memory 502 may include high-speed random access memory, and may further include non-volatile memory, such as at least one disk storage device, flash memory device, or other volatile solid-state storage device. The input apparatus 503 is capable of receiving input digital or character information and generate signal input related to user settings and functional control of the video dubbing device.

Specifically, in one embodiment, the processor 501 can load an executable file corresponding to the process of one or more applications into the memory 502 according to instructions, and the applications stored in the memory 502 are executed by the processor 501, thereby realizing various functions of the above-mentioned video dubbing device.

It should be noted that, herein, relational terms such as "first" and "second" are only used to distinguish one entity or operation from another entity or operation, and do not necessarily require or imply any actual relationship or order between these entities or operations. Moreover, the terms "include", "comprise", or any other variation thereof are intended to cover non-exclusive inclusion, so that a process, method, article, or device including a series of elements includes not only those elements, but also other elements not explicitly listed, or elements inherent in the process, method, article, or device. Without further restrictions, an element defined by the statement "include a . . . " does not exclude the existence of other identical elements in the process, method, article or device that includes the element.

What have been described above are only specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments described herein, but will conform to the widest scope consistent with the principles and novel features disclosed herein.

What is claimed is:

1. A video dubbing method, comprising:
    in response to an audio recording start trigger operation for a first time point of a target video and starting from a video picture corresponding to the first time point, playing the target video based on a timeline and receiving audio data based on the timeline; and
    in response to an audio recording end trigger operation for a second time point of the target video, generating an audio recording file comprising the audio data from the first time point to the second time point, wherein
    the audio recording file is configured for dubbing a video clip, the video clip takes the video picture corresponding to the first time point as a starting frame and takes a video picture corresponding to the second time point as an ending frame, and the audio recording file has a linkage relationship with a timeline of the video clip;
    wherein before the in response to the audio recording end trigger operation for the second time point of the target video, generating the audio recording file comprising the audio data from the first time point to the second time point further comprises:
    controlling a pointer on an audio track to follow a video picture being played when playing the target video based on the timeline and receiving the audio data based on the timeline, wherein the pointer is configured to indicate a current audio recording progress.

2. The method according to claim 1, further comprising:
    in a state where a video dubbing is paused, in response to a drag operation on the pointer, updating the first time point by using a time point corresponding to a target frame of the drag operation.

3. The method according to claim 2, wherein before the in response to the audio recording end trigger operation for the second time point of the target video, generating the audio recording file comprising the audio data from the first time point to the second time point further comprises:
    displaying a waveform diagram of the audio data based on the timeline when playing the target video based on the timeline and receiving the audio data based on the timeline.

4. The method according to claim 2, wherein before the in response to the audio recording start trigger operation for the first time point of the target video and starting from the video picture corresponding to the first time point, playing the target video based on the timeline and receiving the audio data based on the timeline further comprises:
    displaying a flashing animation at a position of the first time point of the target video, wherein the flashing animation is configured to prompt a preparation of audio recording based on the first time point.

5. The method according to claim 2, after the in response to the audio recording end trigger operation for the second time point of the target video, generating the audio recording file comprising the audio data from the first time point to the second time point further comprises:
    performing a preview playing on the video clip and the audio recording file having the linkage relationship with the timeline of the video clip.

6. A computer-readable storage medium, wherein instructions are stored in the computer-readable storage medium, and the instructions, when executed on a terminal device, enable the terminal device to implement the method according to claim 2.

7. A device, comprising:
    a memory;
    a processor; and
    a computer program, stored on the memory and capable of running on the processor, wherein
    the processor, when executing the computer program, implements the method according to claim 2.

8. The method according to claim 1, wherein before the in response to the audio recording end trigger operation for the second time point of the target video, generating the audio recording file comprising the audio data from the first time point to the second time point further comprises:
    displaying a waveform diagram of the audio data based on the timeline when playing the target video based on the timeline and receiving the audio data based on the timeline.

9. The method according to claim 1, wherein before the in response to the audio recording start trigger operation for the first time point of the target video and starting from the video picture corresponding to the first time point, playing the target video based on the timeline and receiving the audio data based on the timeline further comprises:
    displaying a flashing animation at a position of the first time point of the target video, wherein the flashing animation is configured to prompt a preparation of audio recording based on the first time point.

10. The method according to claim 1, after the in response to the audio recording end trigger operation for the second time point of the target video, generating the audio recording file comprising the audio data from the first time point to the second time point further comprises:
    performing a preview playing on the video clip and the audio recording file having the linkage relationship with the timeline of the video clip.

11. A computer-readable storage medium, wherein instructions are stored in the computer-readable storage medium, and the instructions, when executed on a terminal device, enable the terminal device to implement the method according to claim 1.

12. A device, comprising:
    a memory;
    a processor; and
    a computer program, stored on the memory and capable of running on the processor, wherein
    the processor, when executing the computer program, implements the method according to claim 1.

13. A video dubbing method, comprising:
    in response to an audio recording start trigger operation for a first time point of a target video and starting from a video picture corresponding to the first time point, playing the target video based on a timeline and receiving audio data based on the timeline; and
    in response to an audio recording end trigger operation for a second time point of the target video, generating an audio recording file comprising the audio data from the first time point to the second time point, wherein the audio recording file is configured for dubbing a video clip, the video clip takes the video picture corresponding to the first time point as a starting frame and takes a video picture corresponding to the second time point as an ending frame, and the audio recording file has a linkage relationship with a timeline of the video clip;

wherein before the in response to the audio recording end trigger operation for the second time point of the target video, generating the audio recording file comprising the audio data from the first time point to the second time point further comprises:

displaying a waveform diagram of the audio data based on the timeline when playing the target video based on the timeline and receiving the audio data based on the timeline.

14. The method according to claim 13, wherein before the in response to the audio recording start trigger operation for the first time point of the target video and starting from the video picture corresponding to the first time point, playing the target video based on the timeline and receiving the audio data based on the timeline further comprises:

displaying a flashing animation at a position of the first time point of the target video, wherein the flashing animation is configured to prompt a preparation of audio recording based on the first time point.

15. The method according to claim 13, after the in response to the audio recording end trigger operation for the second time point of the target video, generating the audio recording file comprising the audio data from the first time point to the second time point further comprises:

performing a preview playing on the video clip and the audio recording file having the linkage relationship with the timeline of the video clip.

16. A computer-readable storage medium, wherein instructions are stored in the computer-readable storage medium, and the instructions, when executed on a terminal device, enable the terminal device to implement the method according to claim 13.

17. A device, comprising:
a memory;
a processor; and
a computer program, stored on the memory and capable of running on the processor, wherein
the processor, when executing the computer program, implements the method according to claim 13.

18. A video dubbing apparatus, comprising:
a receiving module, configured to, in response to an audio recording start trigger operation for a first time point of a target video and start from a video picture corresponding to the first time point, play the target video based on a timeline and receive audio data based on the timeline; and a generation module, configured to, in response to an audio recording end trigger operation for a second time point of the target video, generate an audio recording file comprising the audio data from the first time point to the second time point, wherein the audio recording file is configured for dubbing a video clip, the video clip takes the video picture corresponding to the first time point as a starting frame and takes a video picture corresponding to the second time point as an ending frame, and the audio recording file has a linkage relationship with a timeline of the video clip;

wherein the apparatus further comprises:
a control module, configured to control a pointer on an audio track to follow a video picture being played when playing the target video based on the timeline and receiving the audio data based on the timeline, wherein the pointer is configured to indicate a current audio recording progress.

* * * * *